(12) United States Patent
Coma Asensio

(10) Patent No.: US 8,820,206 B2
(45) Date of Patent: Sep. 2, 2014

(54) BULLET PROJECTILE AND CASE FEEDING DEVICE

(76) Inventor: Victor Javier Coma Asensio, Saragossa (ES)

(*) Notice: Subject to any disclaimer, the term of this patent is extended or adjusted under 35 U.S.C. 154(b) by 3 days.

(21) Appl. No.: 13/696,616

(22) PCT Filed: Apr. 27, 2012

(86) PCT No.: PCT/ES2012/070289
§ 371 (c)(1),
(2), (4) Date: Nov. 7, 2012

(87) PCT Pub. No.: WO2012/152968
PCT Pub. Date: Nov. 15, 2012

(65) Prior Publication Data
US 2013/0152771 A1 Jun. 20, 2013

(30) Foreign Application Priority Data

May 9, 2011 (ES) .................................. 201100505
Dec. 23, 2011 (ES) .................................. 201132096

(51) Int. Cl.
*F42B 33/00* (2006.01)
*B65G 47/14* (2006.01)
*B65G 47/256* (2006.01)

(52) U.S. Cl.
CPC ............... *F42B 33/001* (2013.01); *F42B 33/00* (2013.01); *F42B 33/002* (2013.01); *B65G 47/1457* (2013.01); *B65G 47/256* (2013.01); *F42B 33/004* (2013.01)
USPC .......................................................... 86/19.5

(58) Field of Classification Search
USPC .................... 86/19.5, 23, 24, 27, 45
See application file for complete search history.

(56) References Cited

U.S. PATENT DOCUMENTS

| 454,578 | A | * | 6/1891 | Jacobs | 86/27 |
| 2,371,126 | A | * | 3/1945 | Best et al. | 86/54 |
| 2,818,964 | A | * | 1/1958 | Picard et al. | 198/449 |
| 3,635,325 | A | * | 1/1972 | Sterling | 198/397.05 |
| 4,312,438 | A | * | 1/1982 | Vatsvog | 198/392 |
| 7,497,155 | B2 | * | 3/2009 | Koskela | 86/45 |
| 7,552,668 | B1 | * | 6/2009 | Gonzalez | 86/45 |
| 2004/0025678 | A1 | | 2/2004 | Shields | |
| 2008/0053296 | A1 | | 3/2008 | Koskela | |

FOREIGN PATENT DOCUMENTS

FR 2264718 A 1/1975

OTHER PUBLICATIONS

International Search Report dated Aug. 27, 2012 for PCT/ES2012/070289.

* cited by examiner

*Primary Examiner* — Reginald Tillman, Jr.
(74) *Attorney, Agent, or Firm* — Kramer Amado, P.C.

(57) ABSTRACT

The present invention relates to a bullet-projectile and case feeding device, characterized in that it comprises a drum (1) internally provided with at least two compartments: a concentric inner compartment (6), and another outer compartment (7), wherein the compartments (6, 7) are suitable for housing cases or bullets-projectiles. The bottom of the drum (1) has an inclination of essentially 45° to 70°, the compartments are provided with: first housings (8) and second housings (9) forming positioning means for positioning the bullets-projectiles and cases, and one inner tube (3) and one outer tube (4) per compartment for feeding the assembly press, said bullets-projectiles and cases being moved in a disorderly manner when the drum rotates (1) and accessing said inner tube (3) and outer tube (4). The device is used in a feeding method for feeding bullets and cases to an assembly press and in a case annealing method.

18 Claims, 15 Drawing Sheets

BULLET PROJECTILE AND CASE FEEDING DEVICE

OBJECT OF THE INVENTION

The present invention relates to a bullet-projectile and case feeding device, said feeding being into the corresponding ammunition cartridge manufacturing or reloading press where the different components forming part of the ammunition cartridges are assembled. The invention also presents a system which uses a feeding device such as that described, an ammunition cartridge manufacturing or reloading press feeding method and a case annealing or heating method.

BACKGROUND OF THE INVENTION

In both the handgun ammunition and rifle ammunition cartridge reloading and manufacturing fields, cartridges have a case, a bullet or projectile, a piston as gunpowder charge initiator and the gunpowder itself, such that all these components are currently assembled in machines called presses.

Conventional presses need various automatisms, mechanical or manual means, electric means and/or a mixture of means for feeding the materials which will form the ammunition cartridge to be reloaded or manufactured, said cartridge which, as is evident, has already been fired in the case of reloading, or is new in the case of manufacturing but is to be loaded.

Currently the most optimal form of feeding bullets-projectiles and cases to the corresponding assembly presses is done by means of the participation of two machines or devices, one feeding cases and another feeding bullets-projectiles, all independently. Feeding bullets-projectiles and cases can even be done manually.

Presses need to be supplied with both cases and bullets-projectiles in a certain manner, whether manually or automatically, such that the correct feeding position is pointing upwards, both with respect to feeding projectiles and with respect to feeding cases which, added to the need of having to use two feeding devices or machines, entails important economic costs, complex structures, taking up greater space, etc.

In the manufacture or reloading of metal ammunition cartridges there are different processes imparting certain features to their respective elements, these elements being the case, propelling charge, piston and bullet-projectile. Each element acquires suitable properties and features, both in the manufacture and in the reloading of certain cartridges. For cases, it is sometimes necessary to apply heat in certain areas thereof. This heat applied to the material with which the case is manufactured imparts features suitable and specific for said element preventing cracks later on and releasing stresses in the case. Currently there are devices which allow positioning cases in the correct position for subsequently being heated by means of a blowtorch or induction means, such as for example the device known in the state of the art as case annealer.

DESCRIPTION OF THE INVENTION

The present invention relates to a bullet-projectile and case feeding device according to claim 1, a cartridge manufacturing or reloading system according to claim 13, a feeding method for feeding bullets-projectiles and cases to cartridge manufacturing or reloading presses according to claim 14 and a case annealing or heating method according to claim 15. Preferred embodiments of the invention are defined in the dependent claims.

In a first inventive aspect the present invention presents a bullet-projectile and case feeding device, suitable for feeding bullets-projectiles and cases to any conventional ammunition cartridge reloading machine, solving the mentioned technical problems.

The press is simultaneously fed with both cases and bullets-projectiles using this device.

To simultaneously feed the press, the device comprises
  a drum rotated by means of a motor and internally provided
    with at least two compartments:
    a concentric inner compartment,
    and another outer compartment,
  where
  the compartments are suitable for selectively housing cases
    or bullets-projectiles,
  the bottom of the drum has an inclination of essentially 45°
    to 70°,
  the compartments are provided with:
    first housings in the compartment suitable for housing
      bullets-projectiles,
    and second housings for the compartment suitable for
      housing cases
  forming positioning means for positioning the bullets-projectiles and cases, and
    one inner tube and one outer tube per compartment for
      feeding the assembly press,
said bullets-projectiles and cases being moved in a disorderly manner when the drum rotates and accessing said inner tube and outer tube for feeding the assembly press.

The two compartments forming the drum are positioned such that they are concentric and their centre is anchored to the shaft of a motor responsible for rotating the assembly.

The bullets-projectiles and cases are housed in these compartments. They are suitable for selectively housing cases or bullets-projectiles, where "selectively" it means that if cases are housed in one compartment (inner or outer compartment), only bullets-projectiles can be housed in the other compartment, and vice versa. In this manner and by means of a single device the cases and bullets-projectiles of any calibre can be fed independently and at the same time simultaneously to the corresponding ammunition cartridge assembly press or machine.

The inclination together with motor rotation and gravity are used to move the bullets and cases inside their compartments. The inclination is adjustable depending on the demands of the ammunition introduced in said drum.

The first housings which the compartment has for housing the bullets-projectiles, in the form of recesses in one embodiment variant, are such that the bullets fit in them when the motor is rotating and the bullets are being turned over inside said compartment. The bullets-projectiles are thus organised in their compartment housed in their corresponding housings.

The same occurs with the cases, which fit in the second housings in the form of a groove in one embodiment variant. The compartment suitable for housing the cases has these housings where the cases are placed when the motor rotates the drum assembly, turning over all the materials (bullets-projectiles and cases) therein.

The housings are multi-calibre to supply bullets and cases to presses or machines of any type. A drum or disc base with housings the measurements of which are suitable for the calibre or range of bullet and case calibres is used to change that calibre.

The bullets and cases are turned over in the drum when it rotates, making them take their positions in the grooves or recesses as the drum rotates. All this is done for the purpose of allowing a correct automatic placement of the cases and bullets-projectiles in their corresponding areas for making the passage to feeding tubes to the assembly press possible.

Once the bullets and cases have been placed in their positions, they fall in an organised manner into the respective feeding tubes to the press which uses this feeder.

The bullet-projectile and case feeding device according to the first inventive aspect can be provided with annealing or heating means arranged such that they can face the cases, increasing their temperature in the part of such cases exposed to the heat.

A second inventive aspect presents an ammunition cartridge manufacturing or reloading system comprising a bullet-projectile and case feeding device such as that described above.

A third inventive aspect presents a feeding method for feeding bullets-projectiles and cases comprising the steps of providing a bullet-projectile and case feeding device according to the device described above, and feeding bullets-projectiles and cases to the cartridge manufacturing or reloading press.

It is worth noting that the device of the invention places the bullets and cases correctly with regard to how the press or machine in question requires it. A direct mechanism in contact with the case, such as a press, which is not object of the present invention as it is known and used conventionally, such as that described in invention patent US 2010/0275762 for example, is necessary for the final and direct positioning of the bullet on the case.

A fourth inventive aspect presents a case annealing or heating method comprising the steps of:
 a) providing a bullet-projectile and case feeding device according to the first inventive aspect further including case annealing means and adjusting means for adjusting the inclination of the drum,
 b) positioning the drum with an operating inclination for annealing the cases by means of the adjusting means, preferably between 0° and 20°,
 c) providing cases,
 d) positioning the annealing means in their position facing the cases,
 e) activating the motor and annealing means.

The annealing method, also herein referred to as heating method, is useful for prolonging the life of the case and eliminating internal stresses in the material from which the cases are made. The method consists of heating the neck of the case at a predetermined temperature before letting it cool. By raising the temperature of the narrow part or neck of the case or neck, stresses are released and future cracks are prevented. The bullet-projectile and case feeding device according to the first inventive aspect can be provided with annealing or heating means arranged such that they can face the cases, increasing their temperature in the part of such cases exposed to the heat. In an optimal embodiment, the cases are arranged in a vertical position with their narrowest part (the neck) in the upper part. To that end, circular-shaped housings which allow placing the cases in a vertical position are used. The operating inclination for annealing the cases is such that it allows the annealing means to face the cases. Optimal inclination is 0°.

The cases can be provided manually, for example by placing each case in the corresponding housing, or by any positioning means, for example with a case feeding tube.

The annealing means are positioned facing the cases such that the heat affects the neck or narrow part of the case in the most focussed manner possible.

Finally, the motor is activated so that the drum, and with it the cases, rotates, and the case annealing means are activated so that each case passing through these means can be heated or annealed.

The device object of the patent can therefore be used as a bullet and case feeder and also as a case heater or annealer. Therefore, a device capable of carrying out two functions with one device, i.e., feeding bullets and cases and heating/annealing cases, is provided.

DESCRIPTION OF THE DRAWINGS

To complement the description provided below and for the purpose of aiding to better understand the features of the invention according to a preferred practical embodiment thereof, a set of drawings is attached as an integral part of said description in which the following has been depicted with an illustrative and non-limiting character.

PREFERRED EMBODIMENT OF THE INVENTION

Figure 1:
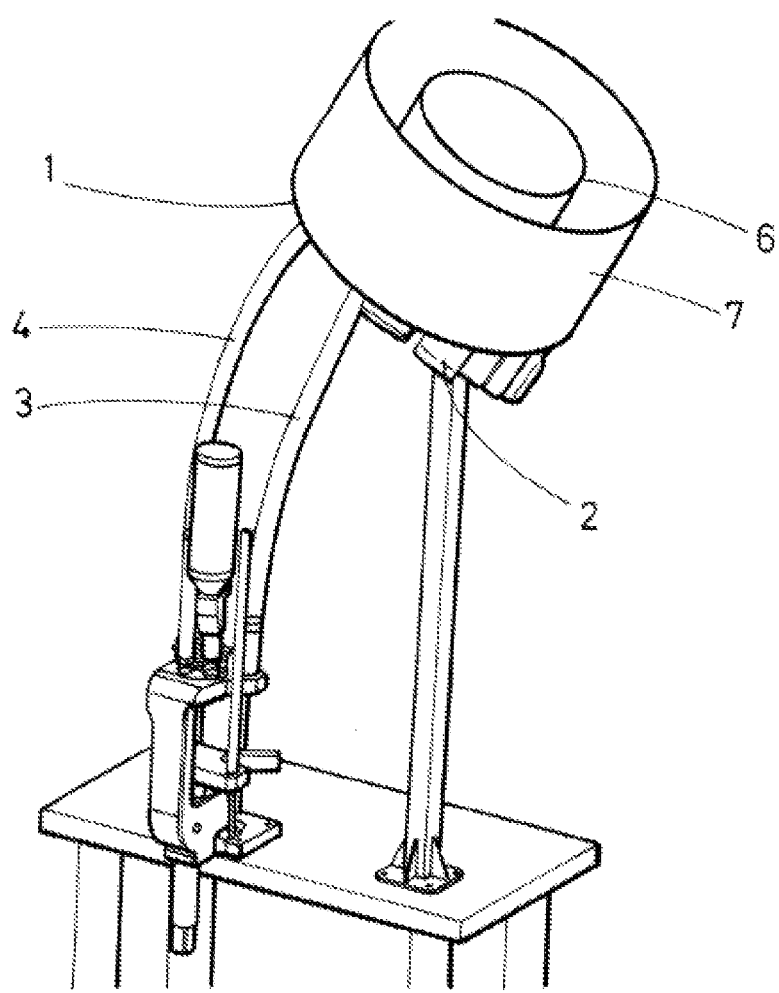
FIG. 1 shows a general external view of a device according to the invention, in which the drum (1) in a slightly inclined position, the feeding tubes (3 and 4) for feeding cases and bullets-projectiles, as well as the drive motor (2) can be seen.
Figure 4:
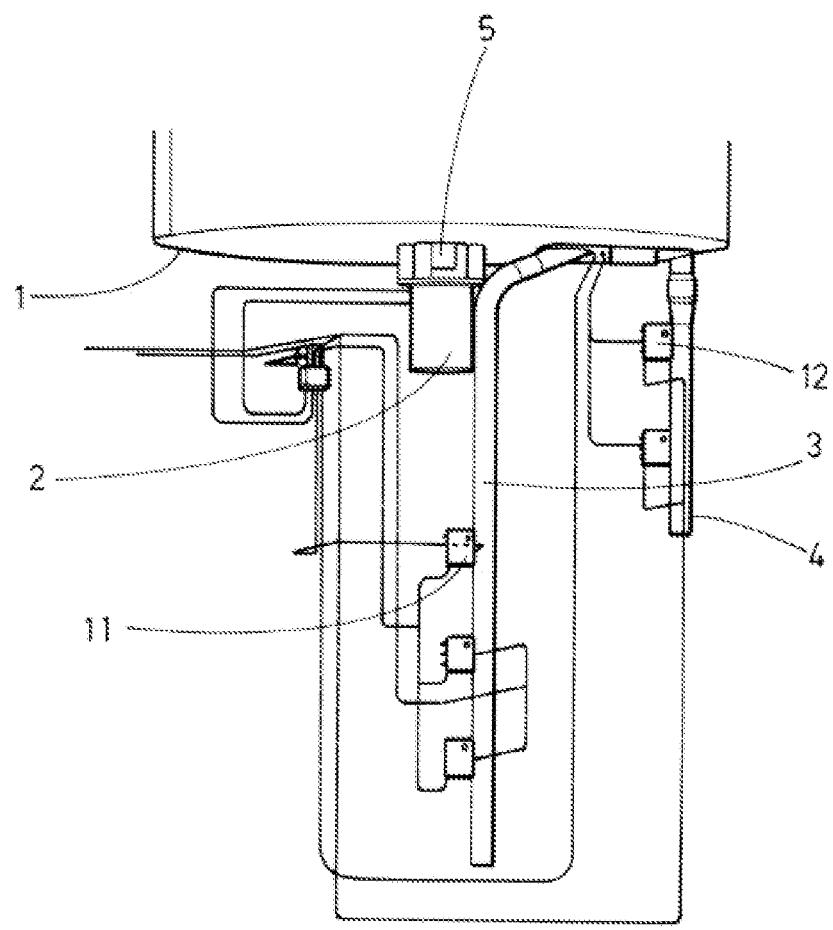
FIG. 4 shows a general elevational view of a device according to the invention where parts such as the drum (1) and the tubes (3 and 4) can be distinguished.

FIG. 1 shows the device of the invention with its typical assembly on a table and the press which will assemble the cases with the bullets-projectiles. The device comprises a cylindrical drum (1) which is operated by a motor (2) and from which two tubes (3 and 4) project from the lower part, each for feeding bullets-projectiles or cases, depending on the compartment where said materials are located, to the corresponding ammunition cartridge assembly press. The openings of the tubes correspond with the highest area of inclination of the bottom of both compartments. As seen in FIG. 4, the motor (2) is fixed under the lower base of the drum (1) through spacers (5) in this example. Two concentric compartments, an inner compartment (6) and another outer compartment (7), are arranged in the cylindrical drum (1).

Figure 2:
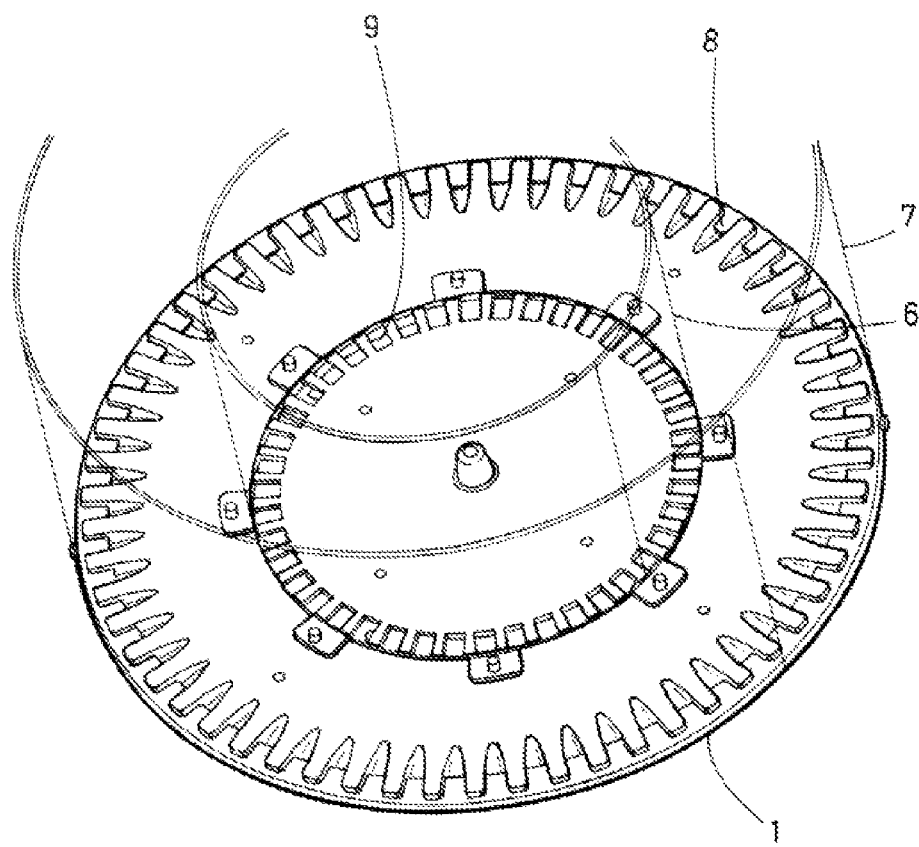
FIG. 2 shows a general external view of a drum (1) according to the invention in which the inner compartment (6) is used to house the cases and the outer compartment (7) is used to house the bullets-projectiles.

In one embodiment, the inner compartment is used to house cases and the outer compartment is used to house bullets, as can be seen in FIG. 2. The bottom of the inner concentric compartment (6) is provided with grooves (9) on its periphery in which the corresponding cases will be positioned, while the bottom of the compartment (7) intended for bullets has, also in proximity to the periphery, recesses (8) for positioning the bullets-projectiles during the rotation of the assembly of the drum (1) and the movement and rotation of those cases and bullets-projectiles.

Figure 3:
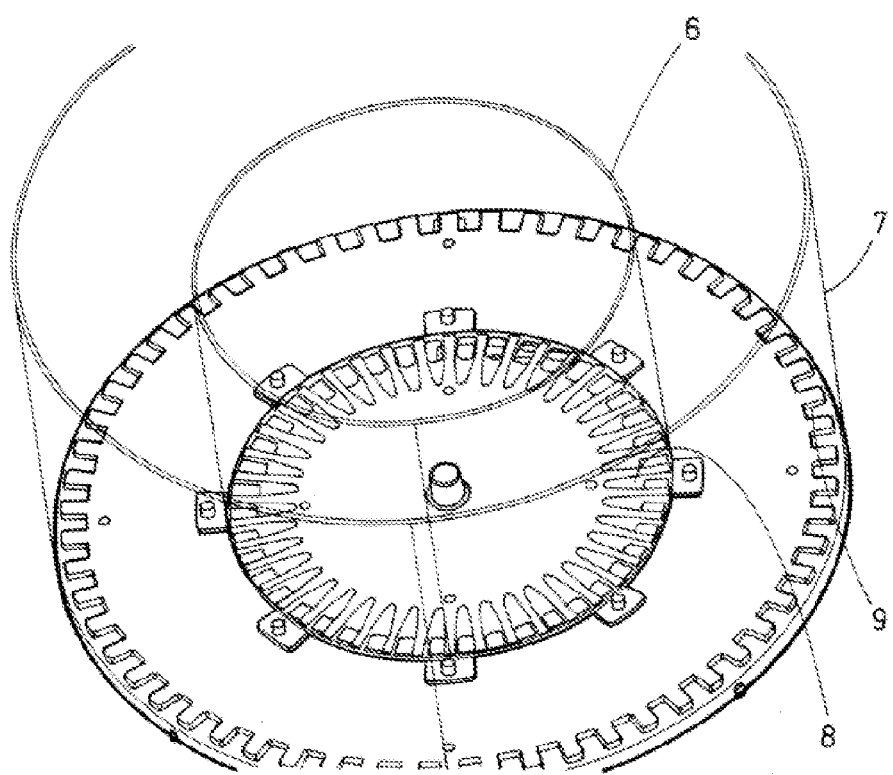
FIG. 3 shows a general external view of a drum (1) according to the invention, in which the inner compartment (6) is used to house the bullets-projectiles and the outer compartment (7) is used to house the cases.

In another preferred embodiment of the invention, the inner compartment is used to house bullets and the outer compartment is used to house cases, as can be seen in FIG. 3. The bottom of the inner concentric compartment (6) is provided with recesses (8) in correspondence with its periphery in which the bullets will be positioned, while the bottom of the compartment (7) intended for cases has grooves (9), also in proximity to the periphery, for positioning cases during the rotation of the assembly of the drum (1) and the movement and rotation of those cases and bullets-projectiles.

In another embodiment of the invention, the tubes (3 and 4) have level detectors or sensors (11 and 12), as can be seen in FIG. 4, which will indicate the bullet-projectile and case fill level of the tubes (3 and 4). If these detectors detect that one of the tubes has been filled the motor (2) is stopped, and in the event of not being full the motor (2) is started up.

Economic, time and space savings as well as a reduced effort both in the feeding and corresponding assembly by the press or reloading machine in question, and both the cases and bullets-projectiles always starting out in a completely disorganized manner in the corresponding drum (1), are achieved with respect to feeders of the state of the art by means of the device described in different embodiments.

In one embodiment of the invention, an electronically operated flap is included in the leading end of the tubes (3 and 4). The flaps are placed at the entrance of respective tubes and close in the event of full tube detection, each tube and closure system being independent from one another.

In a particular case, when both tubes (3 and 4) are closed the motor (2) is stopped. This embodiment provides the advantage of assuring a longer service life of the motor (2) rotating the drum (1) when a single tube (3 or 4) has been filled since it is not necessary to stop the motor (2) to detain the entry of material into the tube (3 or 4) which has been filled. Wear is thus prevented, energy is saved and stability is imparted to the entire equipment given that the assembly of the structure or device generates small vibrations when operating.

In a particular embodiment, the flaps are opened or closed with electrovalves or solenoid valves or electromechanical means, such as servomotors for example. When voltage is applied to the valve, the rod is pushed or retracted. The flap, which can be a machined part with a predetermined thickness, for example 0.5 cm, is fixed to the rod such that it opens or closes depending on whether or not voltage is applied to the solenoid or servomotor.

Figure 18:
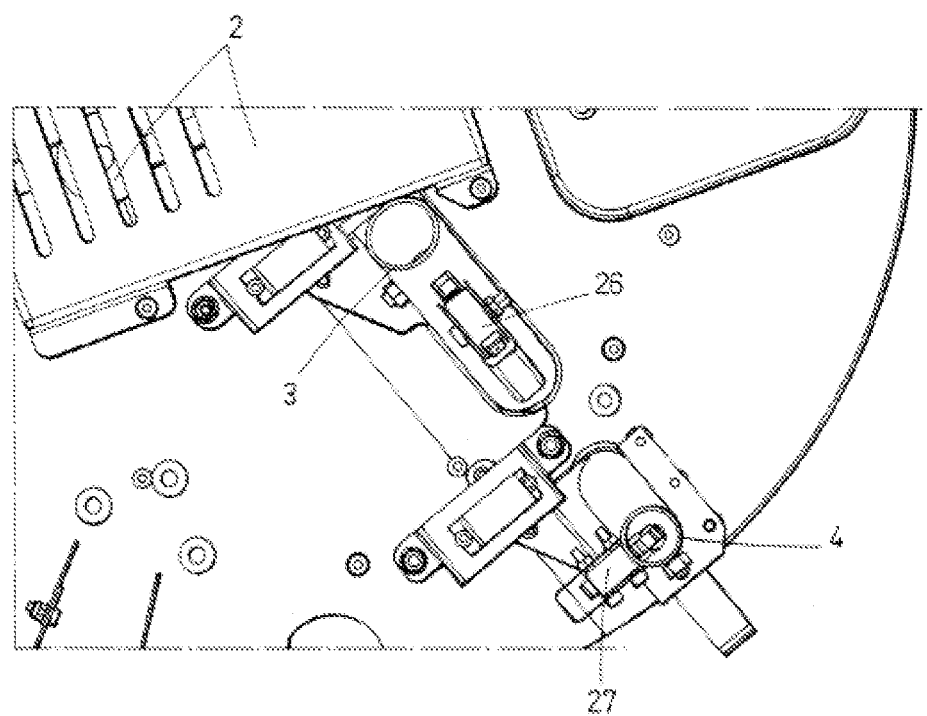
FIG. 18 shows a view from the lower part of a device according to the invention where an example of a flap by means of servomotor valve (26,27) is illustrated.

In a particular example, a flap or electrovalve is used in a tube (3 or 4). If the electrovalve is placed in the opening (19) in the tube for the entry of cases, for example, and this tube is the inner tube (3), when the cases reach the detector (11) the electrovalve closes the tube (3) in a timed manner for a predetermined time or it can also be directly controlled with the detector (11) of its corresponding inner tube (3) for cases. The flap closes the tube (3) preventing more cases from falling when the detector (11) of the inner tube (3) for cases has detected that the inner tube (3) has been filled. The motor (2) continues rotating and bullets continue falling through the outer tube (4) for bullets until filling the outer tube (4) for bullets. In this example, given that only one electrovalve is used, the fill level detector (12) of the outer tube (4) for bullets is electrically connected to the control of the motor (2), which is stopped until the level of bullets in the outer tube (4) for bullets decreases. FIG. 18 illustrates an embodiment of a device with flaps which open or close the tubes (3 or 4) with valves (26, 27).

In one example in which two electrovalves are used, one per tube (3 and 4) for bullets and cases, respectively, and these tubes are the inner tube (3) for cases and the outer tube (4) for bullets, when the cases reach the detector (11), the electrovalve or flap closes the inner tube (3) for cases in a timed manner for a predetermined time, or it can also be controlled directly with the detector (11) of its corresponding inner tube (3) for cases. The flap closes the tube (3), preventing more cases from falling. The motor (2) continues rotating and bullets continue to fall through the outer tube (4) for bullets until filling the outer tube (4) for bullets. In this example, the fill level detector (12) of the outer tube (4) for bullets is electrically connected to the flap of the outer tube (4) for bullets, and the flap closes the outer tube (4) until the fill level of the outer tube (4) for bullets decreases. The motor (2) continues to operate if the two tubes (3 and 4) are not full, and it stops if both tubes (3 and 4) are full at the same time.

Figure 5:
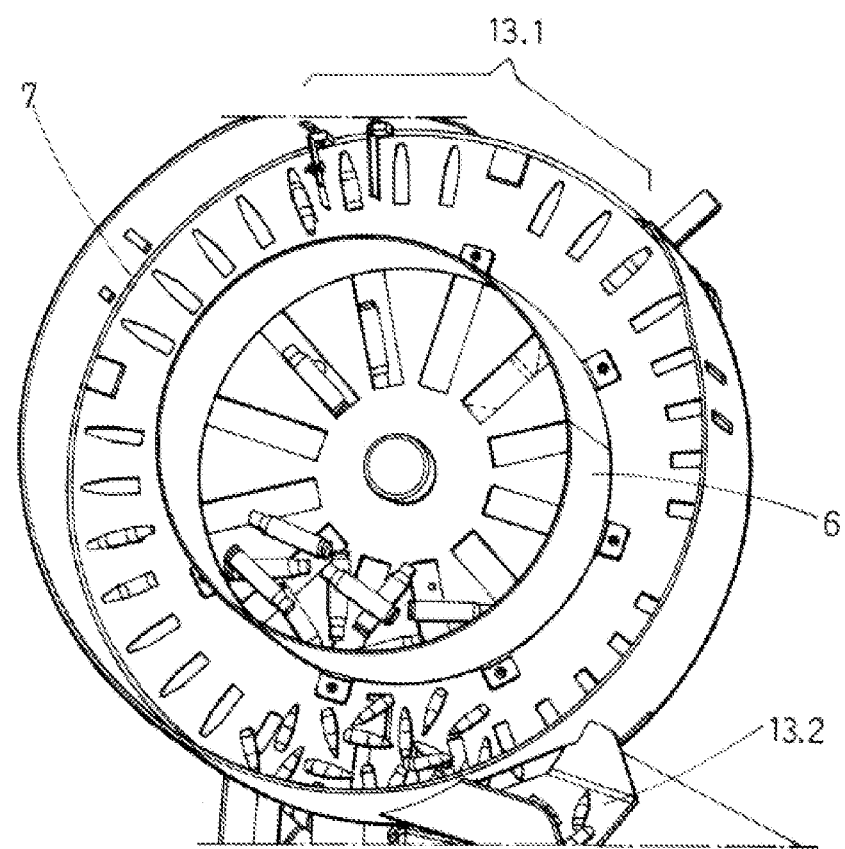
FIG. 5 shows a general elevational view of the drum (1) of a device according to the invention where the two concentric compartments (6 and 7) and material inlet means (13.1 and 13.2) can be distinguished.

In a particular embodiment of the invention, the device comprises material inlet means (13.1 and 13.2). The inlet means can be placed in the outer compartment or inner compartment and can serve as a bullet or case inlet, depending on the compartment in which the bullets or cases are placed. In a particular example, the inlet means are used in the compartment to house the bullets, which can be the inner compartment or the outer compartment. In the particular example of FIG. 5, first bullet inlet means (13.1) and second bullet inlet means (13.2) are depicted in the outer compartment which is the one used to house bullets in the particular example of the drawing.

These bullet inlet means (13.1 and 13.2) provide the technical advantage of being able to introduce bullets through them more easily and comfortably. For example, the outlet of a bullet supplying hopper can be coupled to the bullet inlet means (13.2).

In a particular embodiment, the device comprises selection means (14) for selecting the size of materials in the housings (8 or 9) for the compartment suitable for housing cases or bullets.

Figure 6:
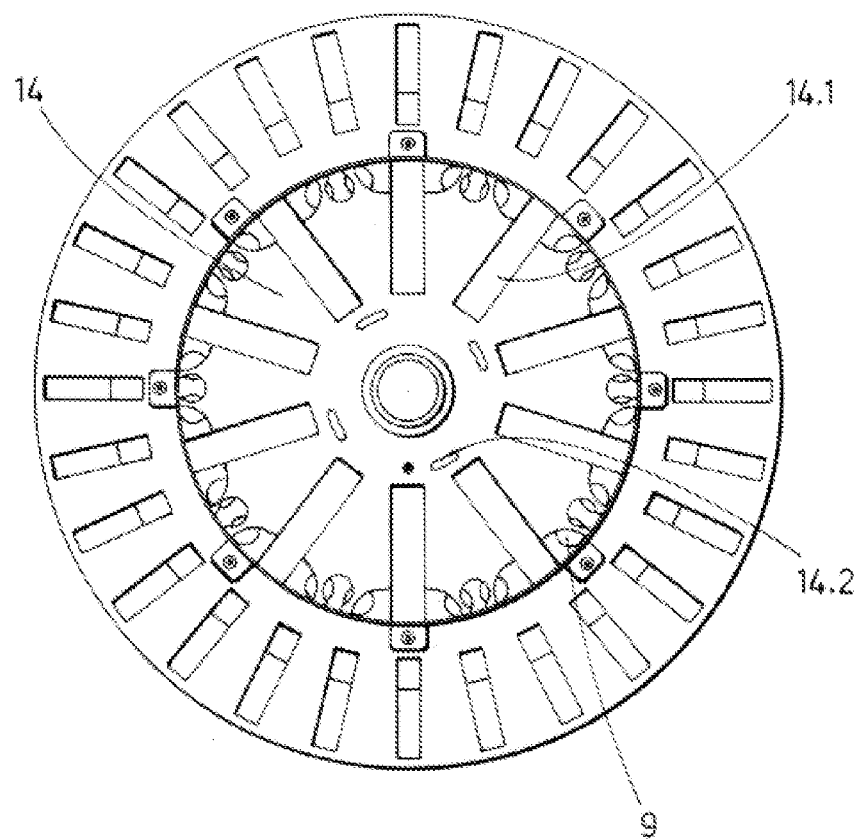
FIG. 6 shows a general plan view of the bottom of a drum (1) where the bottom with housings (9) for cases and the bottom with housings (8) for bullets, as well as the disc (14) with grooves (14.1) for adapting to the size and shape of the cases are distinguished. The end stops (14.2) of the disc (14) are also illustrated.

FIG. 6 illustrates an example of these selection means (14) for selecting the size of the cases. A disc (14) with grooves (14.1) with a predetermined shape is illustrated in the drawing. The shape is predetermined depending on the variety of cases which will be used. These grooves (14.1) fit with the housings (9) for cases which in FIG. 6 are located in the inner compartment and have two shapes: a circular shape and another elongated shape. Therefore, the groove (14.1) has a shape such that it allows uniting the circular and elongated shapes into one. The operation consists in covering and uncovering the housings (9) of the bottom with the disc (14) by means of rotation, for example manual rotation. The position of the grooves (14.1) in the disc (14) is predetermined such that when the disc (14) is covering the housings (9) for rifle calibre cases, the grooves (14.1) allow housing the handgun calibre cases. In the event that the disc (14) is rotated, the rifle case windows which were closed before are now open and the handgun case windows which were open before are now closed. The positions can be fixed with stops (14.2), for example, as illustrated in FIG. 6.

The advantage which these selection means (14) for selecting the size of materials provide is that both handgun cases and rifle cases and bullets of different sizes can be fed with one and the same rotating disc (14).

Figure 7:
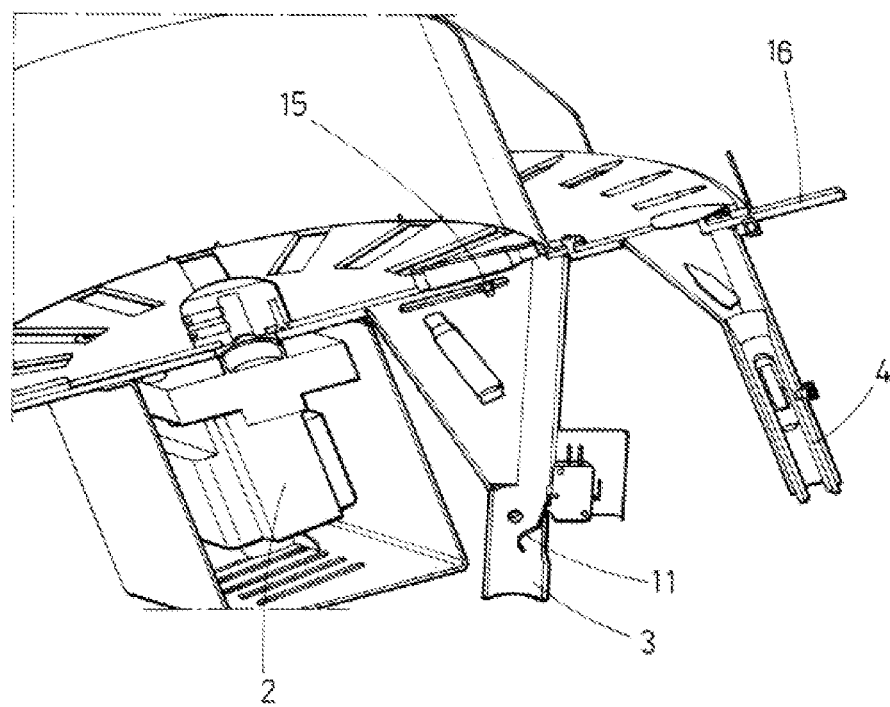
FIG. 7 shows a cross-section view of a drum (1) where the two compartments (6, 7) in addition to the tubes (3, 4) and positioning means (15, 16) are illustrated. A fill level detector or sensor (11) is also illustrated.

In a particular embodiment, the entry of cases and bullets in the tubes, inner tube (3) or outer tube (4), is controlled by first positioning means (15) located at the entrance of the inner tube (3) and second positioning means (16) at the entrance of the outer tube (4). These positioning means (15) are adjustable depending on the size of the case or bullet to be positioned and allow positioning the bullets or cases in a position such that they fall into the correct tube, so that, for example when a bullet falls, it does not fall in backwards, but falls with the pointed part upwards. In one embodiment illustrated in FIG. 7, the positioning means (15) are flanges adjustable according to the size of the bullet or case and they are placed at the entrance of the inner tube (3) and outer tube (4). This is useful in the case where there are long cases because whatever the position of the case is, facing up or down, in FIG. 7, the case falls with the narrow end pointing upwards due to gravity and point of equilibrium. This is because most of the mass is concentrated at the end opposite the narrow end or mouth of the case. In the example of FIG. 7, positioning means (15) which are a screw or solid shaft in one embodiment, are used in the central area of the opening (19) of the inner tube (3), after visual calculation, half that of the case being worked with; this shaft has the function of transferring the case by the heaviest side, this shaft can further be adjusted for adapting it to various rifle calibres. In the same figure, a flange (16) is used to position the bullets. The operation is the same as for the screw (15) positioning the cases.

For handgun cases, a specific cavity for such calibres is arranged at the end furthest from the centre of the disc. Positioning means (15) can equally be adapted to prevent cases from rotating inside the opening (19) which empty into the inner tube (3).

Figure 10:
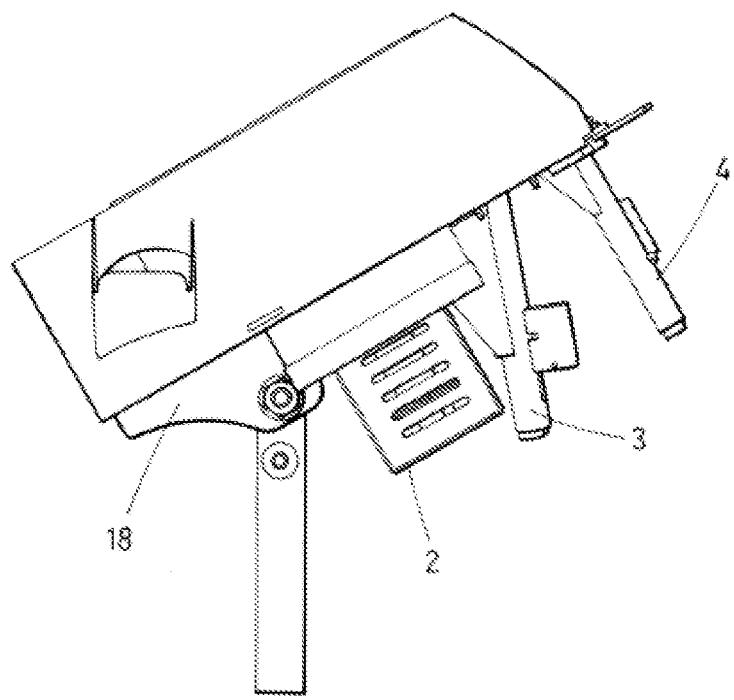
FIG. 10 shows a profile view of a device of the invention where parts such as the tubes (3, 4), the motor (2) and adjusting means (18) for adjusting the inclination of the drum (1) can be distinguished.

In one embodiment, the system comprises adjusting means (18) for adjusting the angle of inclination of the drum from 0° to 90°. FIG. 10 illustrates these adjusting means (18) which enable varying the position angle of the drum (1) so that the entire assembly is more versatile. It further provides the advantage of being able to choose a suitable angle so that the materials contained inside the drum (1), bullets and cases, can be correctly placed in their housings (8, 9) and can take the position which is of interest depending on the shape of the housings (8, 9) and the application.

In the example illustrated in FIG. 10, these adjusting means (18) are a drilled U-shaped sheet metal part (18). A screw (18.1) is screwed through said U-shaped part as a securing and adjusting shaft such that when the desired angle has been achieved, the part (18) and the drum (1) are fixed at that same angle.

In one embodiment, the system comprises case annealing or heating means (17). These annealing or heating means (17) in one embodiment are a blowtorch coupled to the compartment for housing the cases. In tempering or heating or annealing operations, the temperature of the narrow end or neck of the cases is increased for the purpose of freeing said area of the case of stresses and possible cracks. This is useful for prolonging the life of the case and is used in metal ammunition manufacturing and reloading processes.

Figure 8:
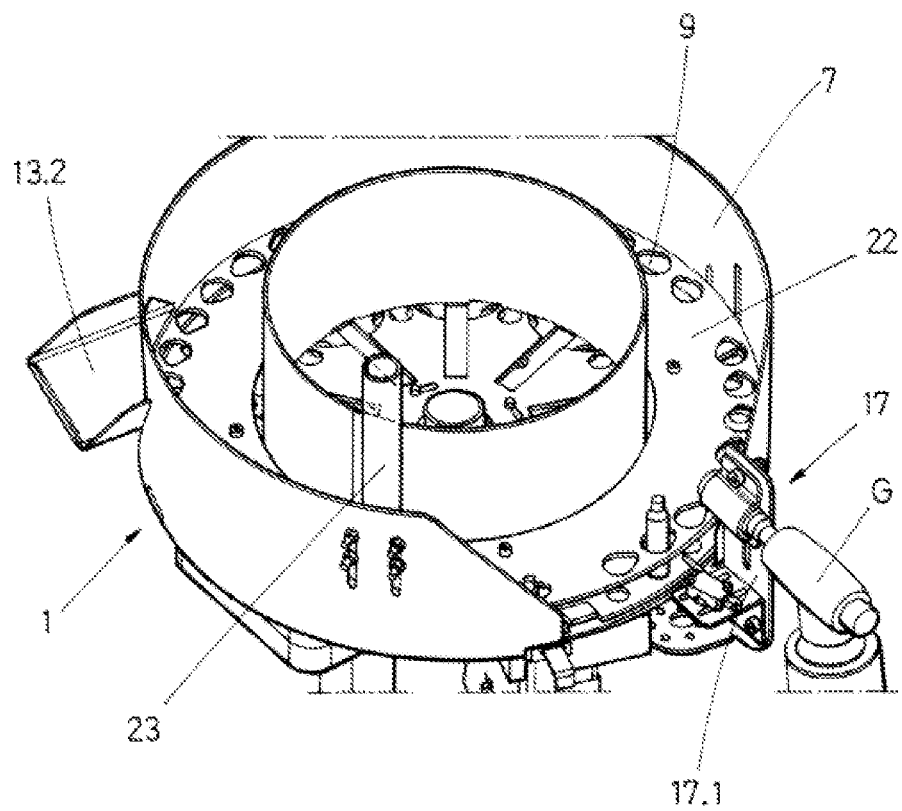
FIG. 8 shows a general perspective view of an outer compartment (7) comprising annealing means (17) which in the embodiment of the figure are a gas blowtorch (G).

FIG. 8 illustrates an embodiment with these annealing or heating means (17) with a blowtorch (G). The figure illustrates the outer compartment (7) of the drum (1) where the cases are located in this embodiment. The housings (9) of the cases are further illustrated as being circular-shaped. The circular shape of the housings (9) for housing cases of the example illustrated in FIG. 8 advantageously arranges the cases vertically. In the particular example, an additional ring-shaped disc (22) is used which advantageously adds an additional point of support to the cases since it provides the compartment (7) with two heights. When the drum rotates (1) each case is put in front of a gas blowtorch (G) secured by securing means (17.1), which can be adjustable in height for adapting to any case calibre, for a predetermined time and controlled electronically or by means of a predetermined drum rotation speed. Once the cases pass through the annealing or heating means (17), they fall into the tube (3 or 4) of the corresponding compartment. In FIG. 8 the cases fall into the tube of the outer compartment (7), i.e., the outer tube (4). This depiction includes a case feeding tube (23) from where the cases are provided for facilitating the correct positioning of the cases in the circular-shaped housings (9).

In another embodiment, the cases are located in the inner compartment (6) and the annealing or heating means (17) face the cases in the inner compartment (6).

Figure 9:
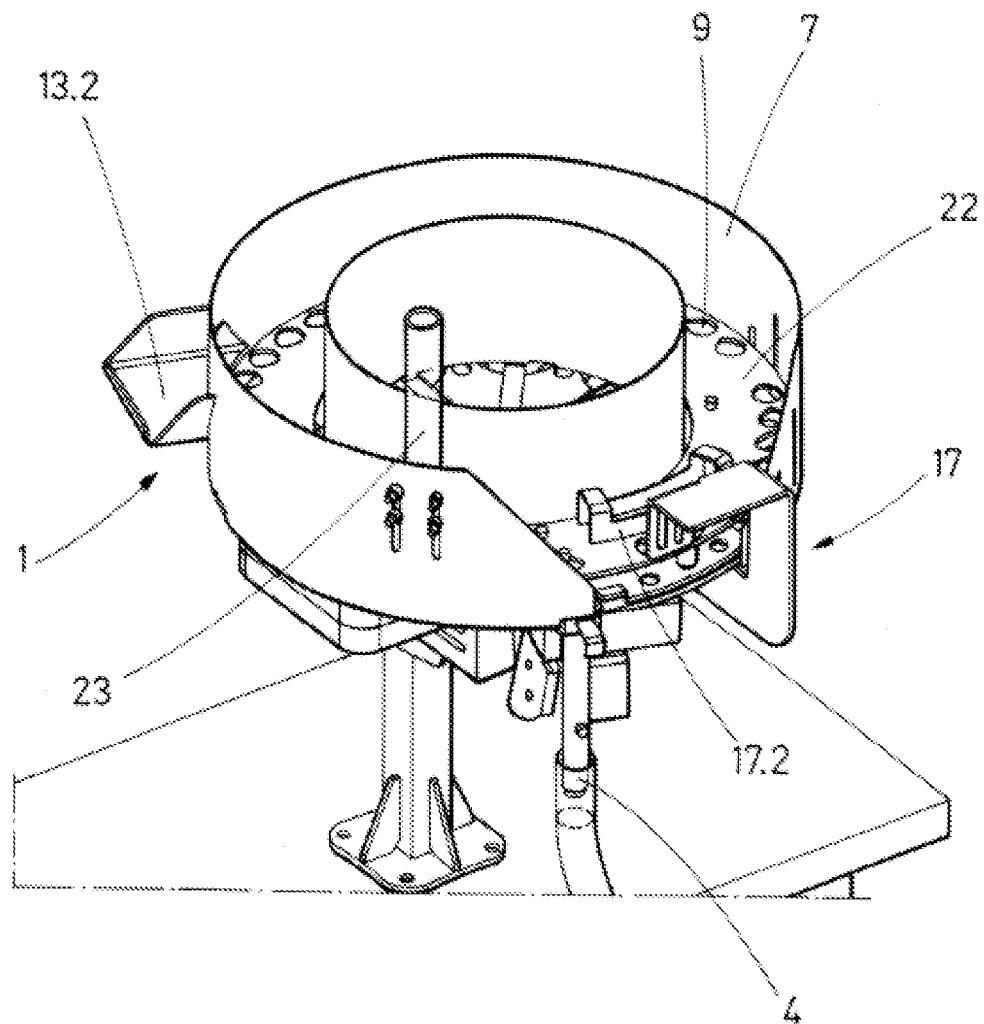
FIG. 9 shows a general perspective view of an outer compartment (7) comprising annealing means (17) which in the embodiment of the figure are induction means (17.2).

In a particular example, the annealing or heating means (17) are induction means (17.2), as shown in FIG. 9. In a particular example, these induction means (17.2) are a ring-shaped metal part (17.2) with a circumference suitable for enveloping the upper part of the case. This metal part can be secured by means of a screw or shaft to an arm attached to the lower part of the drum (1) which allows adjusting the height of the annealing means (17), adapting to any case calibre. The electronics heating the metal part (17.2) are located in the lower part of the drum (1). The metal part (17.2) can be placed manually on the compartment (6 or 7) suitable for housing the cases and as the drum (1) rotates at a predetermined speed, the cases located in the circular-shaped housings (9) are heated by induction. After having heated the cases at a typical case annealing temperature to prevent cracks or release stresses, the cases will fall into the tube (3 or 4) corresponding to the compartment for cases (6 or 7) which is being used. In FIG. 9, the cases fall into the tube of the outer compartment (7), i.e., the outer tube (4). FIG. 9 shows the induction means (17.2) facing the cases in the outer compartment (7). This depiction includes a case feeding tube (23) from where the cases are provided for facilitating the correct positioning of the cases in the circular-shaped housings (9).

The heating means (17) are further optimally used with the drum in its horizontal position (0°) using the embodiment which includes adjusting means (18) for adjusting the angle of inclination of the drum.

It is important for the use of the bullet-projectile and case feeding device to be suitable for feeding a conventional ammunition cartridge manufacturing or reloading press when the drum is inclined at an angle between 45° and for its functionality to vary when annealing or heating means (17) are used. In the case of using annealing means (17), the device is adapted so that the tubes (3 and 4) empty into a container, or wherever the user wants, where the cases are cooled before being used. Furthermore, the angle of inclination of the drum in the optimal case is 0°.

In one embodiment of the invention, the housings (8, 9) for the compartment suitable for housing the cases and bullets have a shape suitable for fitting with the shape of the cases or bullets. These housings (8, 9) are formed with notches which adapt to the shape that the case or bullet has in each embodiment. Different embodiments are mentioned below.

Figure 11:
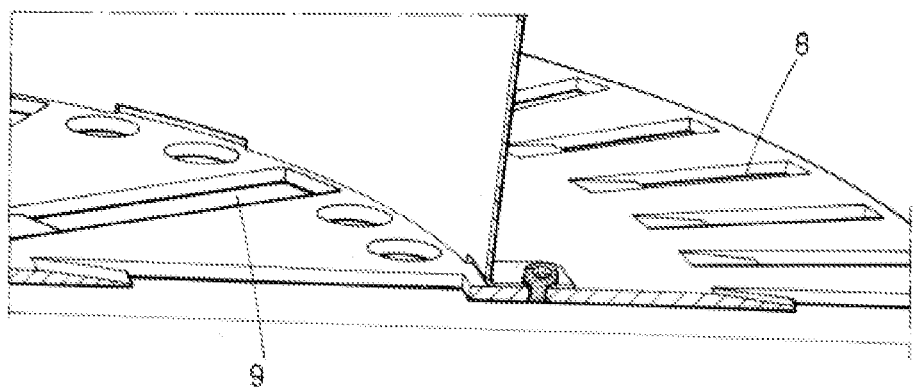
FIG. 11 shows a view of the bottom of a drum (1) where the housings (8 and 9) in the form of windows with a ramp are seen.
Figure 12:
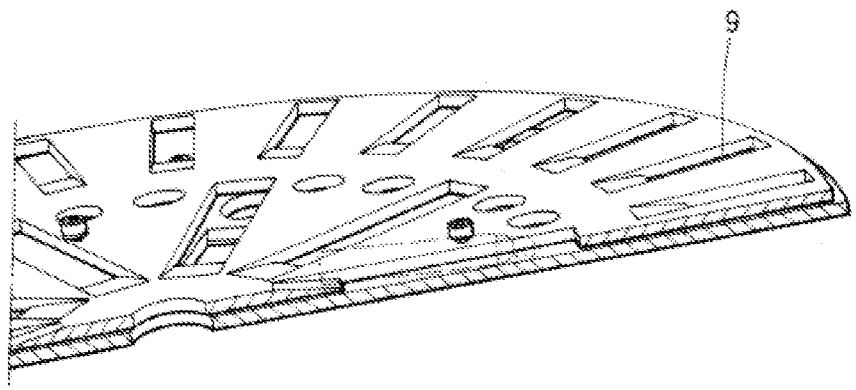
FIG. 12 shows a view of the bottom of a drum (1) where the housings (8 and 9) in the form of windows with a ramp and an example of a well positioned case are seen.

In a particular example illustrated in FIG. 11, these housings (8, 9) are in the form of a rectangular window with a ramp having a predetermined angle. If these housings (8) are for bullets, if the bullet is supported on the ramp, since it does not have support surface the bullet falls due to gravity and its own weight. If these housings (9) are for housing rifle calibre cases as illustrated in FIG. 12, when the body is placed in the window, said case is supported, but in contrast if the case is placed on the ramp, since it does not have any support, the case falls to the bottom of the drum (1) with the rest of the cases due to gravity and weight.

Figure 13:
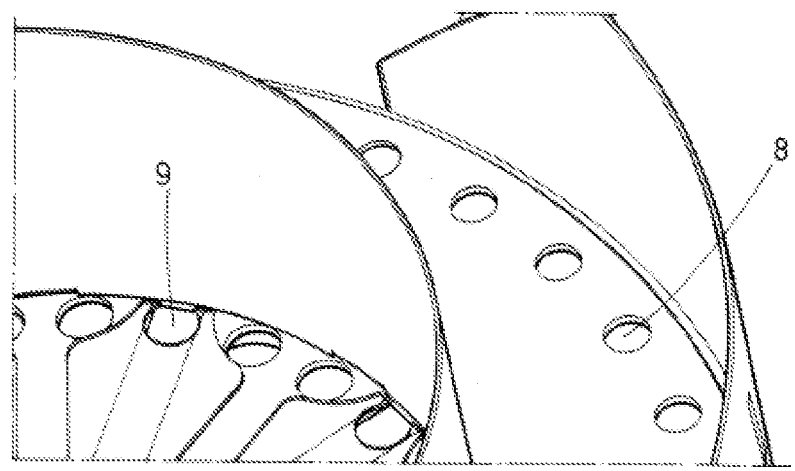
FIG. 13 shows a view of the bottom of a drum (1) where circular-shaped housings (8 and 9) are seen.
Figure 14:
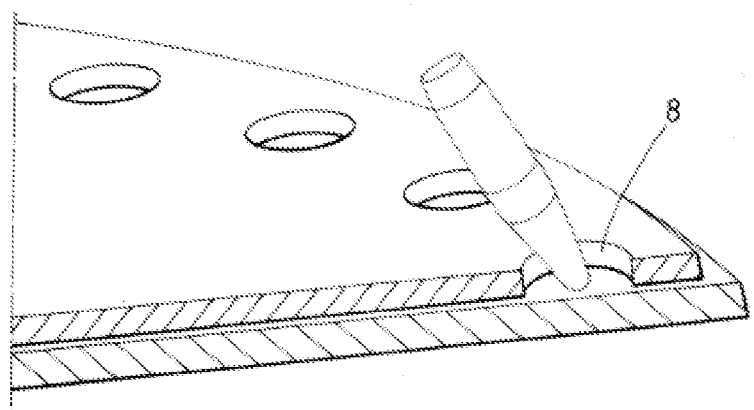
FIG. 14 shows a view of the bottom of a drum (1) where circular-shaped housings (8 and 9) and a poorly positioned falling bullet are seen.

In a particular example, as illustrated in FIG. 13, the housings (8, 9) are circular-shaped. This example is advantageous for using with handgun calibres both for bullets and cases. This system is mainly based on the fact that a bullet cannot be supported on its own tip, but stands on its base. This is illustrated in FIG. 14.

Figure 15:
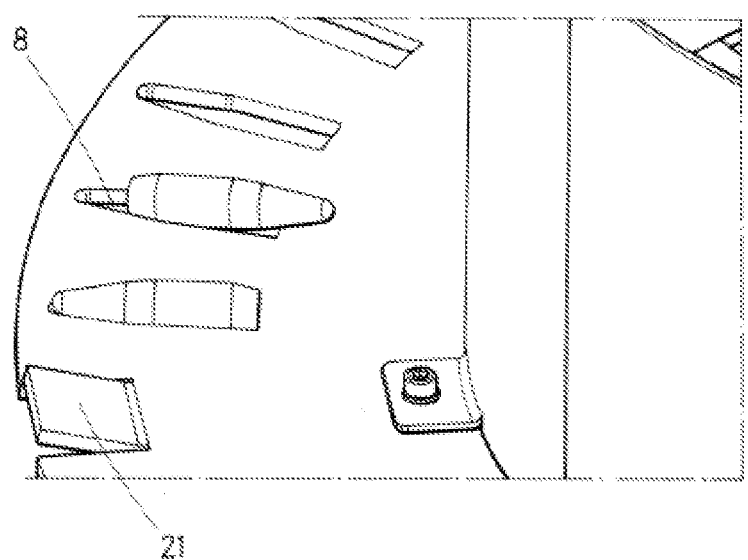
FIG. 15 shows a view of the bottom of a drum (1) where the housings (8) in the form of a silhouette formed for adapting to the shape of the bullet and two bullets, a poorly positioned bullet and well positioned bullet, are seen. Means (21) for turning over materials are also illustrated.

In a particular example, the housings (8, 9) have the shape of the silhouettes of bullets or cases. This model is very advantageous for rifle bullets. The housings have the shape of the silhouette of bullets but with a slightly larger perimeter (0.2 tenths larger for example) so that the bullet can only be placed in the correct position. In the case of being poorly supported, the bullet projects from that silhouette and falls when the drum rotates. An example of the silhouette is illustrated in FIG. 15.

Figure 16:
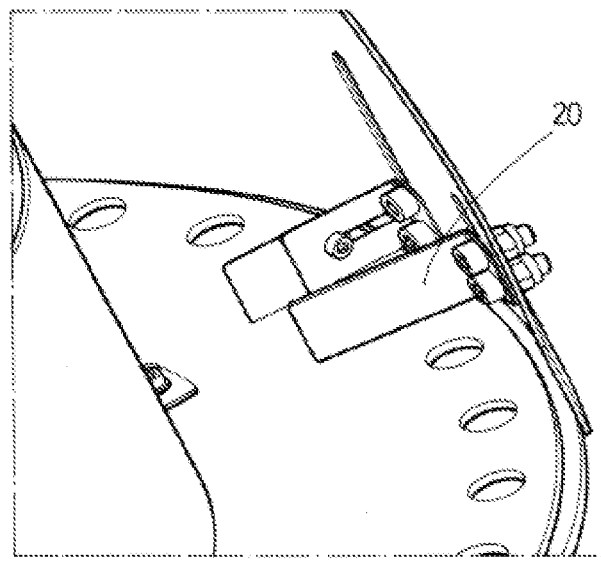
FIG. 16 shows a view of the bottom of a drum (1) where material rejection means (20) are seen.
Figure 17:
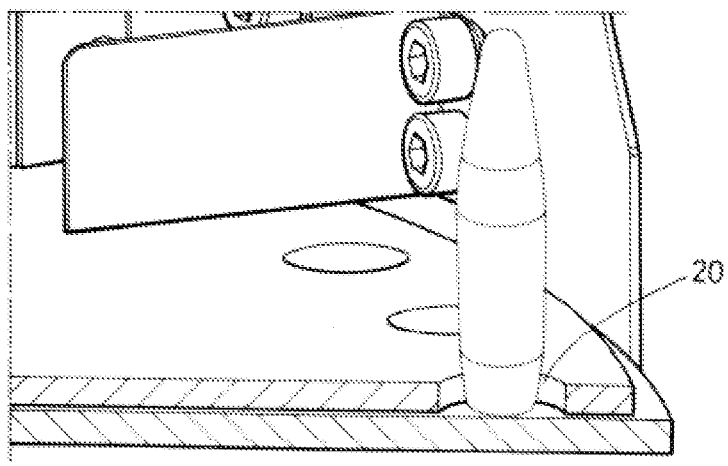
FIG. 17 shows a view of the bottom of a drum (1) where material rejection means (20) and a well positioned bullet which is not rejected because its proper positioning prevents it from falling when being pushed by the material rejection means (20) are seen.

In one example of the invention, the system comprises case rejection means, not shown, in the compartment suitable for housing cases and bullet rejection means (20) in the compartment suitable for housing bullets. In a particular example, these rejection means (20) illustrated in FIG. 16 are flanges (20) which push the poorly positioned bullets or cases into their housings (9, 10). FIG. 17 illustrates a bullet which is not rejected because it is well positioned in the housing (9) for housing the bullet.

In a particular example, means (21) for turning over materials are used in the compartments (6 and 7). In a particular embodiment as illustrated in FIG. 15, these means are projections (21) made with the metal bottom of the drum itself and raised a predetermined angle. These projections (21) favour the movement of materials inside the drum.

The invention claimed is:

1. A bullet-projectile and case feeding device, configured to feed bullets-projectiles and cases to a cartridge manufacturing or reloading press, comprising:
   a drum rotated by means of a motor and internally provided with at least two compartments including:
      a concentric inner compartment, and
      another outer compartment; and
   one inner tube for said inner compartment, and one outer tube for said outer compartment;
   wherein the compartments are configured to selectively house cases or bullets-projectiles,
   the bottom of the drum has an inclination of essentially 45° to 70°, and said at least two compartments are provided with:
      first housings in at least one of inner compartment and outer compartment configured to house bullets-projectiles, and
      second housings in at least one of inner compartment and outer compartment configured to house cases,
      said first housings and second housings forming positioning means for positioning the bullets-projectiles and cases;
   wherein, when said drum rotates, said bullets-projectiles and cases move in a disorderly manner and access said inner tube and said outer tube for feeding the assembly press.

2. The bullet-projectile and case feeding device according to claim 1, wherein first housings and second housings are in different compartments.

3. The bullet-projectile and case feeding device according to claim 2, where the compartment for housing the bullets-projectiles is the inner compartment and the compartment for housing the cases is the outer compartment.

4. The bullet-projectile and case feeding device according to claim 1, characterised in that the feeding tubes for feeding cases and bullets-projectiles comprise fill level detectors, sending signals to the corresponding motor for stopping it in the event that the feeding tubes are filled or for starting it up in the event of reaching a level below the pre-established level.

5. The bullet-projectile and case feeding device according to claim 4, characterised in that at least one of the tubes has a flap which is closed in the event that it is filled and the other tube is at a lower fill level, allowing the rotation of the motor and supply of bullets-projectiles or cases, where appropriate, to the respective tube, while the other is full.

6. The bullet-projectile and case feeding device according to claim 1, characterised in that it comprises bullet inlet means.

7. The bullet-projectile and case feeding device according to claim 1, characterised in that it comprises selection means for selecting the size of materials in the housings for the compartment configured to house the cases or bullets.

8. The bullet-projectile and case feeding device according to claim 1, characterised in that the entry of cases and bullets in the tubes, inner tube or outer tube, comprises first positioning means located at the entrance of the inner tube and second positioning means at the entrance of the outer tube for controlling the correct positioning of the case or bullet when falling into the inner tube or outer tube.

9. The bullet-projectile and case feeding device according to claim 1, characterised in that it comprises adjusting means for adjusting the angle of inclination of the drum.

10. The bullet-projectile and case feeding device according to claim 5, characterised in that the flap comprised in at least one of the tubes is an electrovalve.

11. The bullet-projectile and case feeding device according to claim 1, characterised in that it comprises case annealing or heating means.

12. An ammunition cartridge manufacturing or reloading system comprising:
a bullet-projectile and case feeding device according to claim 1, and
a manufacturing or reloading press for manufacturing or reloading said cartridges.

13. A feeding method for feeding bullets-projectiles and cases to cartridge manufacturing or reloading presses comprising,
providing a bullet-projectile and case feeding device according to claim 1, and
feeding bullets-projectiles and cases to the cartridge manufacturing or reloading press by means of said device.

14. A case annealing or heating method comprising the steps of:
a) providing a bullet-projectile and case feeding device according to claim 11,
b) positioning the drum with an operating inclination for annealing the cases by means of the adjusting means, preferably between 0° and 20°,
c) providing cases,
d) positioning the annealing means in their position facing the cases,
e) activating the motor and annealing means.

15. The bullet-projectile and case feeding device according to claim 4, characterised in that it comprises a bullet inlet means.

16. The bullet-projectile and case feeding device according to claim 4, characterised in that the entry of cases and bullets in the tubes, inner tube or outer tube, comprises first positioning means located at the entrance of the inner tube and second positioning means at the entrance of the outer tube for controlling the correct positioning of the case or bullet when falling into the inner tube or outer tube.

17. The bullet-projectile and case feeding device according to claim 1, wherein the first housings have a shape configured to fit a shape of said bullets-projectiles; and
the second housings have a shape suitable for fitting a shape of said cases.

18. The bullet-projectile and case feeding device according to claim 2, where the compartment for housing the bullets-projectiles is the outer compartment and the compartment for housing the cases is the inner compartment.

* * * * *